(12) United States Patent
Ichikawa et al.

(10) Patent No.: US 8,305,649 B2
(45) Date of Patent: Nov. 6, 2012

(54) IMAGE READING DEVICE

(75) Inventors: Hirokazu Ichikawa, Kanagawa (JP); Shin Takeuchi, Tokyo (JP); Eisuke Osakabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 548 days.

(21) Appl. No.: 12/553,739

(22) Filed: Sep. 3, 2009

(65) Prior Publication Data

US 2010/0157383 A1 Jun. 24, 2010

(30) Foreign Application Priority Data

Dec. 24, 2008 (JP) ................................. 2008-327406

(51) Int. Cl.
*H04N 1/04* (2006.01)
(52) U.S. Cl. ......... 358/434; 358/474; 358/475; 358/497
(58) Field of Classification Search .................. 358/473, 358/474, 475, 497, 498
See application file for complete search history.

(56) References Cited

U.S. PATENT DOCUMENTS 5,800,032 A * 9/1998 Uchiyama et al. .............. 353/69
6,473,236 B2 * 10/2002 Tadic-Galeb et al. ......... 359/618

FOREIGN PATENT DOCUMENTS

| JP | 02-183879 | 7/1990 |
| JP | 05-143760 | 6/1993 |
| JP | 10-187871 | 7/1998 |
| JP | 2001-145003 | 5/2001 |
| JP | 2004-094907 | 3/2004 |

* cited by examiner

*Primary Examiner* — Houshang Safaipour
(74) *Attorney, Agent, or Firm* — Morgan, Lewis & Bockius LLP

(57) ABSTRACT

A reading device comprises: an irradiating unit that irradiates light onto a medium; an image forming unit that forms an image from irradiated light reflected from the medium; and an adjusting unit that causes an optical axis of irradiated light to be adjusted, under influence of weight of the irradiating unit, with respect to an optical axis of reflected light that occurs when the image forming unit forms an image of the reflected light.

13 Claims, 7 Drawing Sheets

IMAGE READING DEVICE

CROSS-REFERENCE TO RELATED APPLICATIONS

This application is based on and claims priority under 35 U.S.C. 119 from Japanese Patent Application No. 2008-327406, which was filed on Dec. 24, 2008.

BACKGROUND

1. Technical Field

The present invention relates to an image reading device.

2. Related Art

In recent years, technologies for instantly converting content written on paper to digitalized written information data, transferring this data to a personal computer, mobile telephone or the like, and displaying the written content on a monitor, or transferring/saving the written content as data have been attracting interest. These technologies use special paper having tiny dots formed in various different patterns printed on the surface thereof, and a digital pen (Anoto pen (registered trademark)) that digitizes the written content by reading these dots. This digital pen reads the dot pattern in the vicinity of the pen point with an imaging device when writing is performed on the special paper, and specifies the position of the pen point on the special paper based on the read dot pattern.

SUMMARY

In an aspect of the present invention, there is provided an image reading device including: an irradiating unit that irradiates light onto a medium; an image forming unit that forms an image from irradiated light reflected from the medium; and an adjusting unit that causes an optical axis of irradiated light to be adjusted, under influence of weight of the irradiating unit with respect to an optical axis of reflected light that occurs when the image forming unit forms an image of the reflected light.

BRIEF DESCRIPTION OF THE DRAWINGS

Exemplary embodiments of the present invention will be described in detail based on the following figures, wherein.

DETAILED DESCRIPTION

A. Configuration

Figure 1:
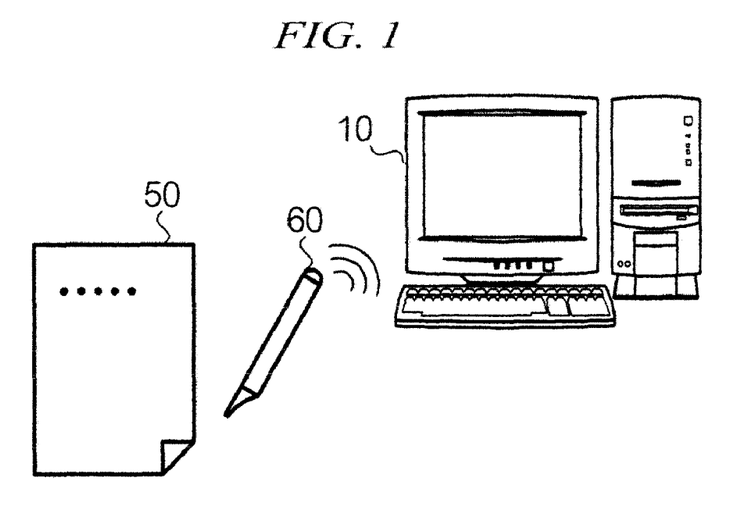
FIG. 1 shows the overall configuration of a writing information processing system.

FIG. 1 shows an exemplary configuration of a system according to an exemplary embodiment of the present invention. In FIG. 1, a digital pen 60 is an exemplary image reading device provided with a function of writing characters, graphics and the like on a medium 50 such as paper, and a function of reading a code pattern image (image to be read) formed on the medium 50. An information processing apparatus 10 is an exemplary writing information generating apparatus that is a personal computer, for example, and generates writing information representing written content according to signals output from the digital pen 60.

Figure 2:
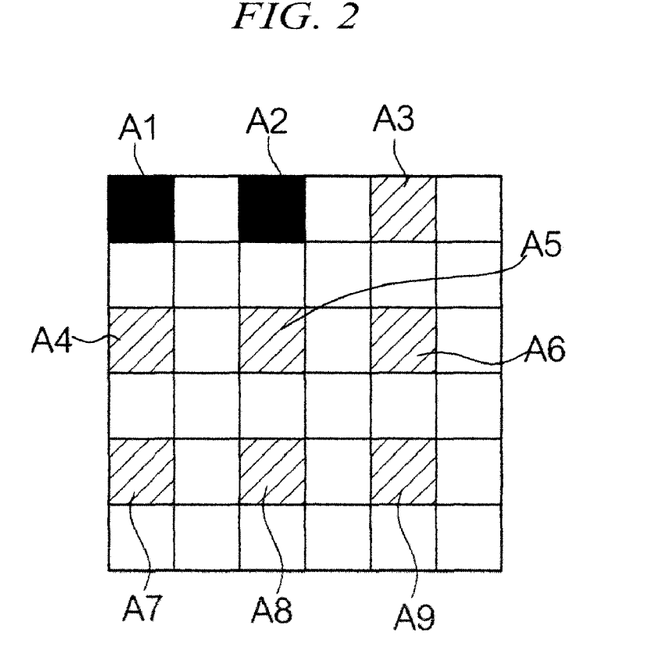
FIG. 2 shows the content of a code pattern image.

The code pattern image formed on the medium 50 is obtained by encoding identification information identifying the medium 50 and position information representing coordinate positions on the medium 50 to create an image. Here, an exemplary code pattern image formed on the medium 50 will be described with reference to FIG. 2. FIG. 2 shows an exemplary code pattern image formed on the medium 50. The code pattern image represents the abovementioned identification information and position information by the mutual positional relation of multiple dot images, and areas A1 to A9 are predetermined as areas in which these dot images can be disposed. In the example shown in FIG. 2, the black areas A1 and A2 show areas in which dot images are disposed, and the shaded areas A3 to A9 show areas in which dot images are not disposed. The identification information and the position information are expressed by which areas the dot images are disposed in. This code pattern image is formed over the entire medium 50 by an electrophotographic image forming apparatus (not shown) such as a printer, for example. The digital pen 60 reads the code pattern image, and then detects the position of a pen point 69a of the digital pen 60 by analyzing the read code pattern image.

A unit from the abovementioned code pattern image, an image such as a document, graphics or the like aimed at conveying information to a person may be formed on the medium 50.

Hereinafter, this image will be called a "document image", but includes images such as pictures, photographs and graphics, as well as other images, rather than being limited to an image representing a document that includes text. The image forming apparatus performs image forming using Black toner when forming a code pattern image, and performs image forming using Cyan, Magenta and Yellow toner when forming a document image. The document image and the code pattern image are formed one on top of the other on the medium 50. The digital pen 60 can be set so as to selectively read only the code pattern image, by respectively forming the code pattern image and the document image using materials with different spectral reflection characteristics.

Note that the "medium" in the present embodiment may be a plastic sheet such as an OHP sheet, for example, or a sheet of another material, rather than being limited to so-called paper. The "medium" may also be so-called digital paper whose display content is electrically rewritable. In short, the medium 50 need only have at least a code pattern image formed thereon by an image forming apparatus or the like.

The digital pen 60 is both a writing instrument that has a function of writing characters, graphics and the like on the medium 50, and an image reading device that reads the code pattern image formed on the medium 50. The digital pen 60 has a function of transmitting information showing the code pattern image read from the medium 50 to the information processing apparatus 10.

Figure 3:
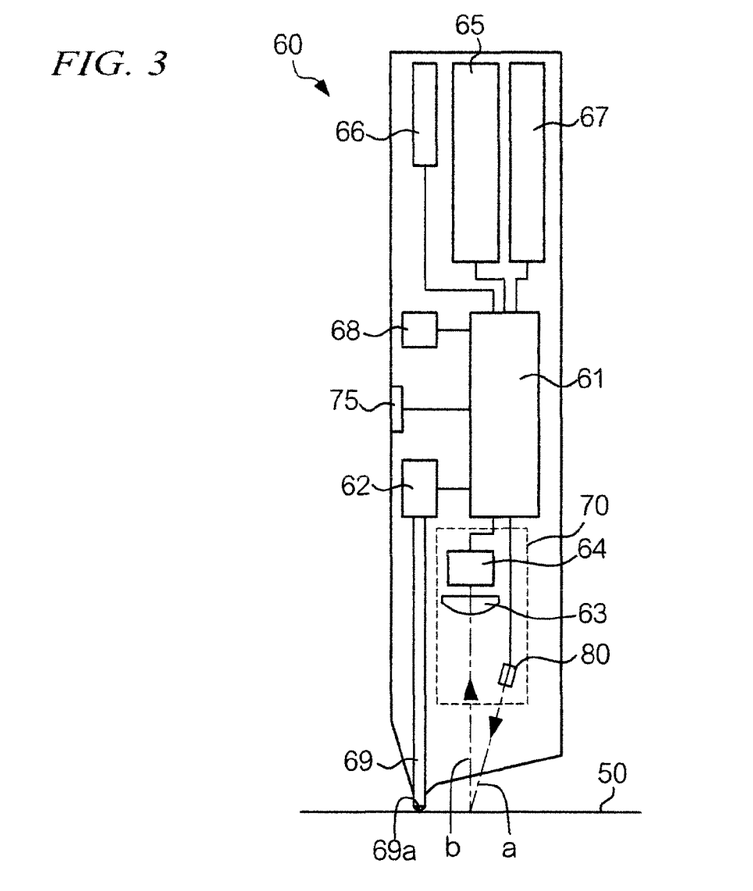
FIG. 3 is a functional block diagram showing the configuration of a digital pen.

Next, an exemplary functional configuration of the digital pen 60 will be described with reference to the drawings. FIG. 3 is a functional block diagram schematically showing the functions of the digital pen 60. In FIG. 3, a controller 61 is a controller that controls the operation of the entire digital pen 60. A pressure sensor 62 is a detecting unit that detects a writing operation by the digital pen 60, by pressure applied to the pen tip 69. An optics unit 70 is equipped with an irradiating unit 80, an image forming unit 63, and an imaging unit 64. The irradiating unit 80 is an exemplary irradiating unit that is a near-infrared LED, for example, and irradiates near-infrared light onto the medium 50 along an irradiation axis a. The image forming unit 63 is an exemplary image forming unit that collects reflected light reflected by the medium 50 along the light-receiving axis b, and forms an image of the image on the medium 50 on the imaging unit 64 according to the reflected light. The imaging unit 64 is an exemplary generating unit that converts the image of the image on the medium 50 formed by the image forming unit 63 according to the reflected light to electrical signals.

An information memory 65 is a memory that stores identification information and position information. A communication unit 66 is a communication unit that controls communication with an external device. A battery 67 is a rechargeable power supply unit that supplies power for driving the digital pen 60 to the various units. A pen ID memory 68 is a memory that stores identification information (pen ID) of the digital pen 60. The pen point 69a, front end of the pen tip 69, forms an instructing unit that instructs a position on the medium 50 having the code pattern image (image to be read) formed thereon, when a writing operation is performed by a user. The irradiating unit 80 irradiates light along the irradiation axis a in an irradiation range predetermined with respect to the position on the medium 50 instructed by the pen point 69a, when a writing operation is performed by the user. In FIG. 3, for the sake of simplicity, beams of light irradiated from the irradiating unit 80 are illustrated as extending in parallel, but the light is actually irradiated in a diffused state.

A switch 75 is a switching unit that switches various settings. These various units are connected to the controller 61.

Figure 4:
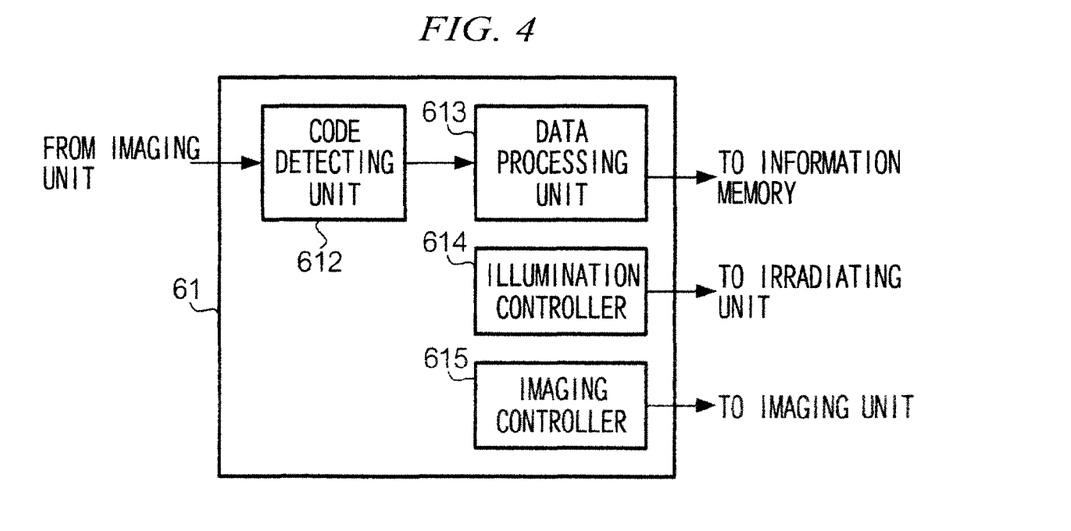
FIG. 4 is a functional block diagram showing a controller of a digital pen.

Next, the functional configuration of the controller 61 will be described with reference to FIG. 4. FIG. 4 is a functional block diagram showing the functions of the controller 61. In FIG. 4, a code detecting unit 612 detects the code pattern image from the signals output from the imaging unit 64 (signals representing imaged images). A data processing unit 613 extracts the identification information and the position information from the code pattern image detected by the code detecting unit 612. An illumination controller 614 transmits illumination control signals for causing the irradiating unit 80 to pulse to the irradiating unit 80, and causes the irradiating unit 80 to pulse. An imaging controller 615 supplies image capture signals that are synchronized with the illumination control signals transmitted to the irradiating unit 80 to the imaging unit 64.

Figure 5:
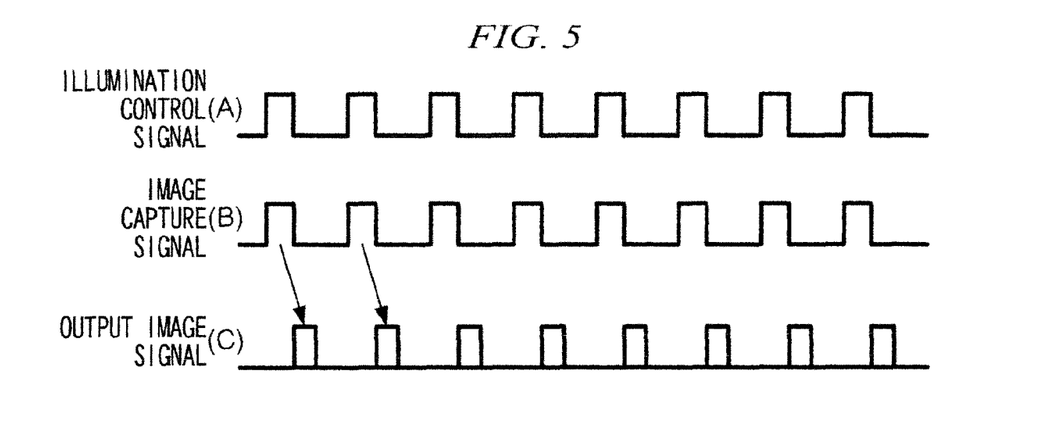
FIG. 5 shows an output timing chart relating to an illumination control signal, an image capture signal and an output image signal.

Further, a schematic of the operation of the controller 61 in the digital pen 60 will be described. FIG. 5 is a timing chart showing output relating to the illumination control signals controlling the pulsing of the irradiating unit 80, the image capture signals to the imaging unit 64, and output image signals. When writing by the digital pen 60 is started, the pressure sensor 62 connected to the pen tip 69 detects the writing operation. The controller 61 thereby starts the process of reading identification information and position information.

Firstly, the illumination controller 614 of the controller 61 transmits illumination control signals ((A) in FIG. 5) for causing the irradiating unit 80 to pulse to the irradiating unit 80, and causes the irradiating unit 80 to pulse.

The imaging unit 64 images the image on the medium 50 in synchronization with the image capture signals ((B) in FIG. 5). At this time, the irradiating unit 80 pulses in synchronization with the image capture signals to the imaging unit 64. The imaging unit 64 images the image on the medium 50 illuminated by the pulsing irradiating unit 80. Thus, in the imaging unit 64, image signals (output image signals: (C) in FIG. 5) relating to the image on the medium 50 illuminated by the irradiating unit 80 are generated in order.

The output image signals sequentially generated by the imaging unit 64 are sent to the code detecting unit 612. The code detecting unit 612, having received the output image signals, processes the output image signals, and detects the code pattern image from the images imaged by the imaging unit 64. The code pattern image acquired by the code detecting unit 612 is sent to the data processing unit 613. The data processing unit 613, having received the code pattern image, decodes the code pattern image, and acquires the identification information and the position information embedded in the code pattern image.

The above is a general description of the digital pen 60.

Figure 7:
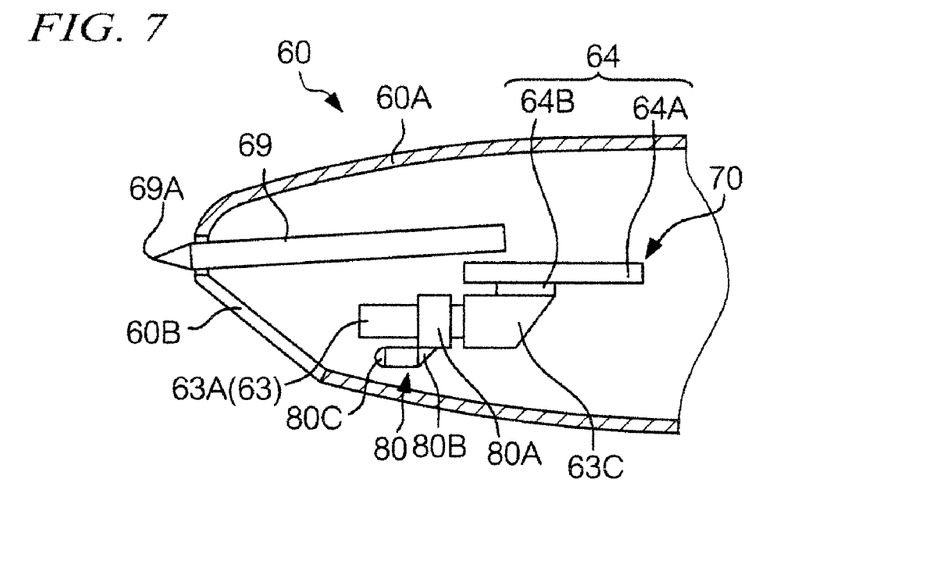
FIG. 7 is a cross-sectional view showing the configuration of a digital pen.
Figure 8A:
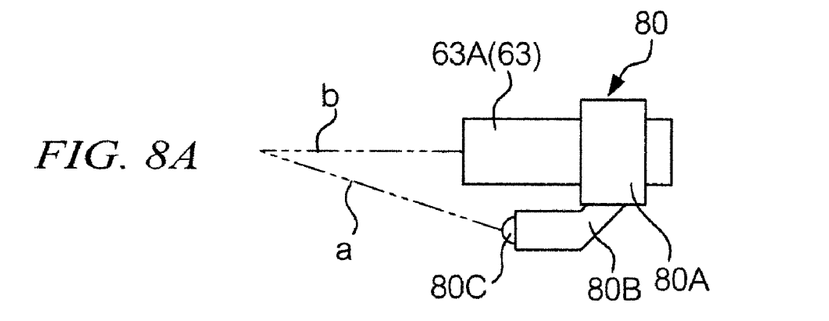
FIGS. 8A and 8B are enlarged views of a relevant unit in FIG. 7.
Figure 8B:
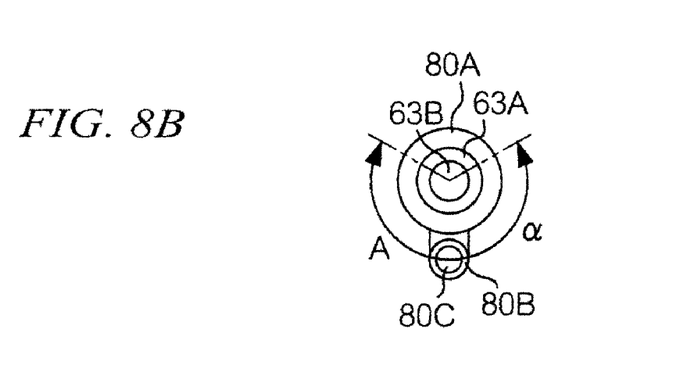

Next, exemplary configurations of the pen tip 69 and the optics unit 70 will be described with reference to the drawings. FIG. 7 is a cross-sectional view schematically showing characteristic units of the digital pen 60, FIG. 8A is an enlarged view of a relevant unit in FIG. 7, and FIG. 8B is a lateral view of FIG. 8A as viewed from the left side.

The pen tip 69 is provided inside a pen body 60A that forms a casing of the digital pen 60, and is used to perform writing on a paper surface. A window 60B is provided in the vicinity of the pen tip 69 at the front end portion of the digital pen 60, the window 60B blocking visible light and transmitting near-infrared light. The optics unit 70 is provided behind the window 60B. The optics unit 70 includes the irradiating unit 80, image forming unit 63 and imaging unit 64. Here, for the sake of simplicity, the optical axis of light irradiated from the irradiating unit 80 will be called an irradiation axis a, and the central axis of the image forming optical system of the image forming unit 63 will be called a light receiving axis b. The direction of the light receiving axis b referred to here is basically in the direction that a light receiving surface faces, and, typically, is in a direction that connects the center of the light receiving surface with the center of an area (hereinafter, called the imaging range) on the medium 50 whose image is formed by the image forming unit 63 and imaged by the imaging unit 64. Therefore, the direction of the light-receiving axis b is substantially parallel to the longitudinal direction of the casing of the digital pen 60.

The image forming unit 63 includes a cylindrical casing 63A, a convex lens 63B (shown in FIG. 8B) provided at a front end side of the casing 63A, and a prism 63C that deflects the direction of image-forming light toward the imaging surface of an imaging device 64B The imaging unit 64 is provided with a base 64A having electronic components mounted thereon, and the imaging device 64B mounted on this base 64A. The imaging device 64B images the code pattern image based on the reflected light of the surface to be read whose image is formed by the image forming unit 63, and outputs signals representing the imaged code pattern image. Here, the imaging device 64B is a CMOS image sensor having sensitivity in a near-infrared region, and a global shutter CMOS image sensor that is able to generate image signals obtained by imaging all pixels at the same timing is used. The imaging device 64B images an image in accordance with an image capture cycle (frame rate) of around 70 fps to 100 fps (frames per second). Here, the irradiating unit 80 is configured so as to pulse in synchronization with the image capture cycle to the imaging device 64B, in order to suppress power consumption. Note that a CMOS image sensor is used here as the imaging device, but the imaging device is not limited to a CMOS image sensor, and another imaging device such as a CCD image sensor may be used.

The irradiating unit 80 has an annular unit 80A that is rotatably attached to the casing 63A, a leg unit 80B that is formed projecting outwardly in the radial direction of this annular unit 80A, and a light source 80C that is provided on a front end side of the leg unit 80B. An annular electrode is respectively provided on the inner circumferential surface of the annular unit 80A and the outer circumferential surface of the casing 63A that forms the site where this annular unit 80A is rotatably attached, and a so-called slip ring is constituted by one of the electrodes having a brush structure. This slip ring supplies illumination control signals output from the substrate 64A to the light source 80C.

Note that the unit that supplies the signals from the substrate 64A to the light source 80C is not limited to a slip ring, and may electrically connect the substrate 64A and the light source 80C by a lead wire, and, in short, need only have a structure that does not cause mechanical resistance when the irradiating unit 80 rotates. Also, the range through which the light source 80C rotates is an angle α (e.g., α=200°) (α≧180°), as shown in FIG. 8B, because of being attached to the substrate 64A. An exemplary adjusting unit that rotates the direction of the irradiation axis a of the irradiating unit 80 around the light receiving axis b is constituted by the structure of the casing 63A of the image forming unit 63 and the annular unit 80A of the irradiating unit 80. Further, since the leg unit 80B and the light source 80C of the irradiating unit 80 are formed projecting outwardly in the radial direction of the annular unit 80A, the leg unit 80B and the light source 80C form a weight. The light source 80C of the irradiating unit 80 thus rotatably moves to the downside under the own weight of this leg unit 80B.

B. Operation

Next, the operation of the digital pen 60 according to the present embodiment will be described. When the user starts writing with the digital pen 60, the pressure sensor 62 connected to the pen tip 69 detects the writing operation. The controller 61 thereby starts the process of reading identification information and position information. Firstly, the illumination controller 614 transmits illumination control signals for causing the irradiating unit 80 to pulse to the irradiating unit 80, and causes the irradiating unit 80 to pulse. Also, the imaging controller 615 of the digital pen 60 supplies image capture signals that are synchronized with the illumination control signals transmitted to the irradiating unit 80 to the imaging unit 64. The imaging unit 64 images the code pattern image based on the reflected light whose image is formed by the image forming unit 63, in response to the image capture signals supplied from the imaging controller 615, and outputs output image signals representing the imaged code pattern image to the code detecting unit 612.

Next, the operations of the code detecting unit 612 and the data processing unit 613 will be described with reference to the flowchart shown in FIG. 6. The output image signals representing the image on the medium 50 are input to the code detecting unit 612 from the imaging unit 64 (step 601). The code detecting unit 612 performs a process for removing noise included in the output image signals (step 602). Here, examples of noise include noise generated by electronic circuitry and variation in CMOS sensitivity. The process performed in order to remove noise is determined according to the characteristics of the imaging system of the digital pen 60. For example, a gradation process or a sharpening process such as unsharp masking can be applied. Next, the code detecting unit 612 detects the dot pattern (position of the dot images) from the image (step 603). Also, the code detecting unit 612 converts the detected dot pattern to digital data on a two-dimensional array (step 604). For example, the code detecting unit 612 converts the detected dot pattern such that positions with a dot are "1" and positions without a dot are "0" on the two-dimensional array. This digital data on a two-dimensional array (code pattern image) is then transferred from the code detecting unit 612 to the data processing unit 613.

The data processing unit 613 detects the dot pattern composed of the combination of two dots shown in FIG. 2, from the transferred code pattern image (step 605). For example, the data processing unit 613 is able to detect the dot pattern, by moving the boundary positions of a block corresponding to the dot pattern over the two-dimensional array, and detecting the boundary positions at which the number of dots included in the block is two. When a dot pattern is thus detected, the data processing unit 613 detects an identification code and a position code, based on the type of dot pattern (step 606). Subsequently, the data processing unit 613 decodes the identification code to acquire identification information, and decodes the position code to acquire position information (step 607). In the process shown FIG. 6, the case where a dot pattern is not detected from an imaged image and the digital pen 60 is unable to acquire identification information and position information (i.e., a reading error) arises, in the case where the amount of light received by the imaging unit 64 is too little or conversely in the case where the amount of received light is too much. In the case where identification information and position information cannot thus be acquired, the data processing unit 613 acquires reading failure information showing reading failure, instead of identification information and position information.

Figure 6:
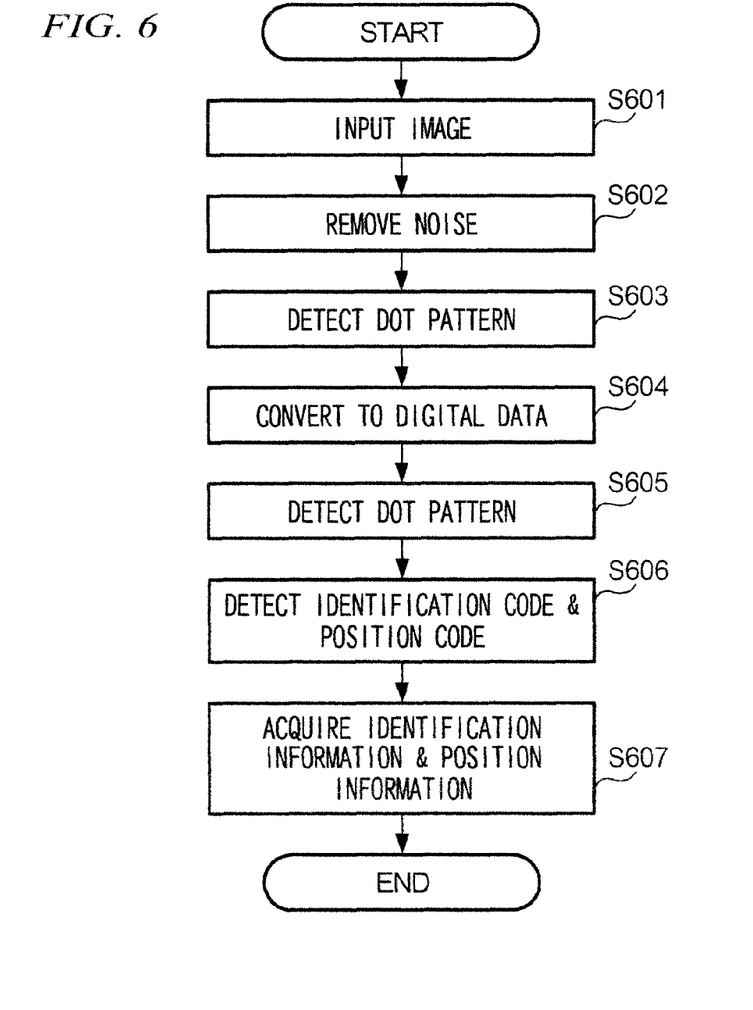
FIG. 6 is a flowchart showing operations by a code detecting unit and a data processing unit of a digital pen.

The digital pen 60 transmits the identification information and the position information acquired by the process of FIG. 6 to the information processing apparatus 10. At this time, the digital pen 60 transmits the information showing reading failure to the information processing apparatus 10, in the case where the reading of identification information and position information fails. The information processing apparatus 10 receives the identification information and the position information from the digital pen 60, and generates writing information based on the received position information. The information processing apparatus 10, in the case where information showing a reading error is received from the digital pen 60, generates writing information by interpolating or the like using identification information and position information received previously or subsequently.

C: Exemplary Operation 1

Next, an example of a specific operation of this embodiment will be described with reference to the drawings. As a result of the user instructing a position on the medium 50 with the digital pen 60, and pressing the pen point 69a against the medium 50, the pressure sensor 62 connected to the pen tip 69 detects the writing operation, and starts the process of reading identification information and position information.

With the digital pen 60 according to the present embodiment, the light source 80C of the irradiating unit 80 moves to the downside around the rotation center of the light receiving axis b under own weight, according to the angle at which the user maintains the digital pen 60, due to the attachment structure of the irradiating unit 80 with respect to the image forming unit 63, except in the case where the pen point of the digital pen 60 faces directly perpendicular (gravitational direction) to the ground. Here, in the case where writing is typically performed with a pen or the like on the medium 50, that is, in the case where the medium 50 is set on a flat surface such as a desk, the medium 50 is maintained in a plane parallel to the ground. The condition whereby specularly reflected light of the light irradiated onto the medium 50 from the irradiating unit 80 enters the image forming unit 63, in a state where the user performs a writing operation on this medium 50 with the digital pen 60, is limited to the case where the light receiving axis b of the image forming unit 63 and the irradiation axis a of the irradiating unit 80 are substantially symmetrical with respect to the normal on the surface of the medium 50. Accordingly, in the case where the user maintains the digital pen 60 in a state of being tilted away from the direction of the normal on the surface of the medium 50 (away from a direction perpendicular with the ground), the irradiating unit 80 will, under its own weight, irradiate light from downside, that is, from the direction of an angle that deviates more than the light receiving axis of the image forming unit 63, with respect to the direction of the normal on the surface of the medium 50. That is, since the positional relation between the irradiating unit 80 and the image forming unit 63 will be in a state where the specular component from the light source 80C does not enter the reflected light whose image is formed by the image forming unit 63, the image reading accuracy in the imaging unit 64 can be enhanced.

Figure 9:
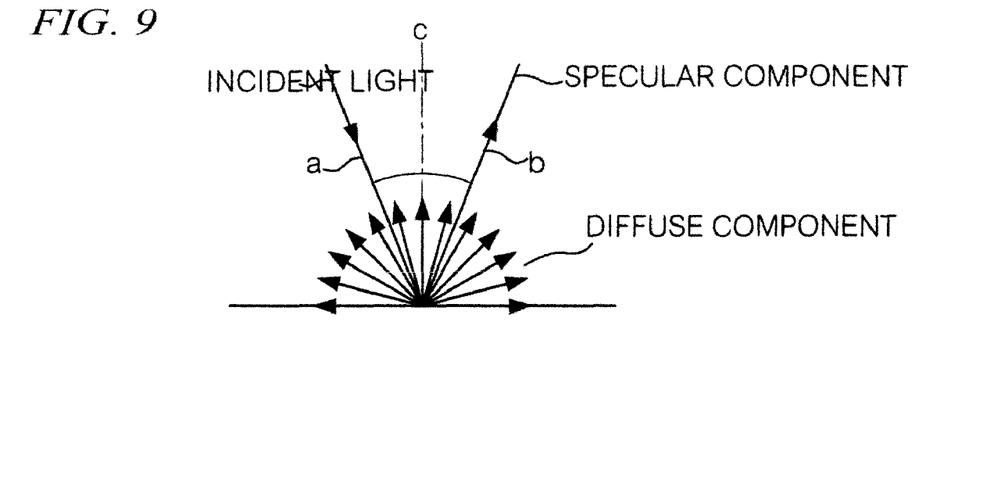
FIG. 9 is a diagram showing characteristics of reflected light with respect to incident light.

The features of the present embodiment will be described more specifically with reference to FIG. 9 and FIGS. 10A and 10B. FIG. 9 is an illustrative diagram illustrating the components of reflected light with respect to incident light on the surface of a medium such as paper, FIG. 10A shows a state where reflected light of a specular component is received by a light receiving unit, and FIG. 10B shows a state where reception of reflected light of a specular component is avoided according to the present embodiment.

As shown in FIG. 9, on the surface of a medium such as paper, specularly reflected light with high directivity and diffusely reflected light with low directivity arise with respect to incident light from a given angle, and reflected light of a specular component is reflected at an angle of reflection that equals the angle of incidence of the incident light. Further, in the case where the light source is disposed on the irradiation axis a of incident light and the image forming unit 63 is disposed on the line of the axis of the specular component, that is, in the case where, as shown in FIG. 10A, a normal h with respect to the medium 50 substantially coincides, at the point where the irradiation axis a of the light source 80C meets the light receiving axis b of the image forming unit 63, with a central axis c that bisects the angle between the axes, an image of the specular component (gloss component of the medium surface) will be formed by the image forming unit 63, and the image on the medium (diffuse component) will not be able to be correctly read.

Figure 10A:
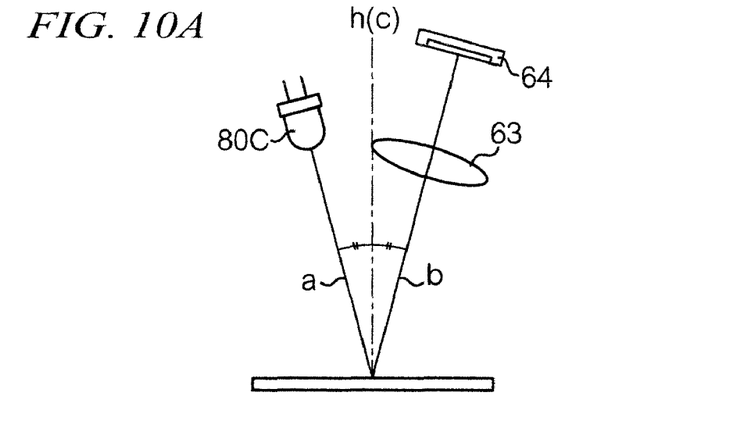
FIGS. 10A and 10B show an exemplary state of writing with a digital pen.
Figure 10B:
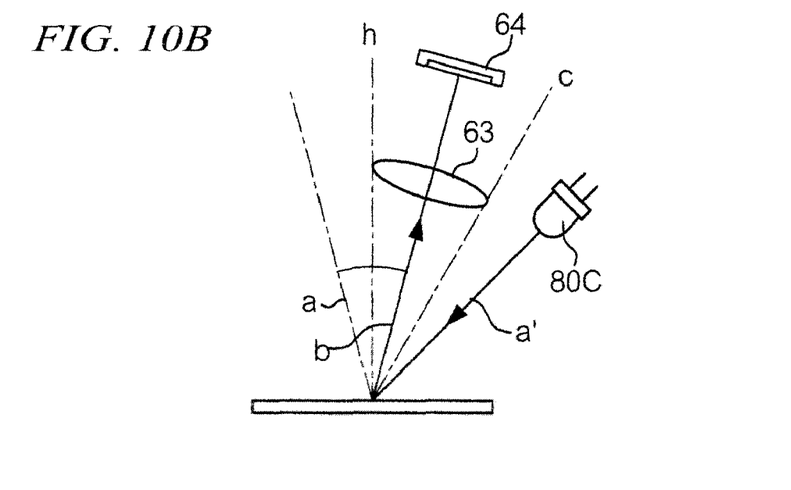

With the digital pen 60 according to the present embodiment, in order to avoid the state in FIG. 10A, the light source 80C rotates under own weight around the rotation center of the light receiving axis b, and moves to an irradiation axis a', as shown in FIG. 10B. The reflected light whose image is formed by the image forming unit 63 will thereby only be a diffuse component, since a central axis c' that bisects the angle between the irradiation axis a' and the light receiving axis b at the point where the axes meet will be in a different direction to the normal h of the medium 50. By reading reflected light of a diffuse component representing image information on the medium 50 with the imaging unit 64, reading errors can thereby be reduced, and reading accuracy can be improved.

The case where the range through which the light source 80C is rotatable is assumed to be an angle α of 200° was illustrated, but in actual fact the irradiation axis a can be moved to the downside of the light receiving axis b, provided the angle α is at least 180°.

Figure 11:
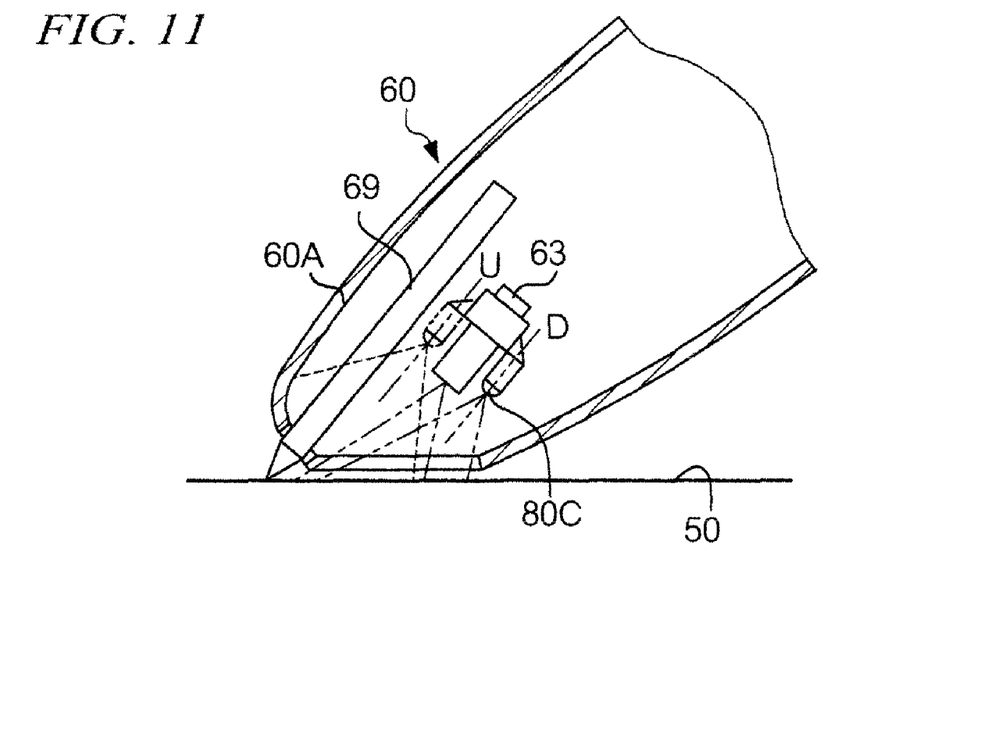
FIG. 11 shows movement of an irradiating unit according to an exemplary embodiment of the invention.

Incidentally, when writing is performed on the medium 50 with the digital pen 60, the angle between the digital pen 60 and the medium 50 successively varies following the writing operation of the user. The case where, for example, the angle between the digital pen 60 and the medium 50 is in the positional relation shown in FIG. 11 at this time will be illustrated. When the user tilts the digital pen 60, with the digital pen 60 according to the present embodiment, the light source 80C rotatably moves under own weight to a position D on the downside of the image forming unit 63. The amount of light irradiated onto the medium 50 from the light source 80C thus increases the closer the light source 80C is to the surface of the medium 50 in distance, compared with at a position U.

With a typical image reading device in the form of a digital pen, since the irradiating unit is fixed, the irradiating unit moves away from the medium surface depending on the angle between the digital pen and the medium, and it may not be possible to perform correct imaging due to an insufficient amount of reflected light being received by the imaging unit 64, but with the digital pen 60 according to the present invention, because the light source 80C moves to the downside of the image forming unit 63, whatever the state of the slope between the digital pen 60 and the medium 50, a sufficient amount of light for imaging can always be irradiated toward the medium 50, enabling errors when image reading is performed to be reduced, and reading accuracy to be improved.

D: Exemplary Operation 2

Figure 12:
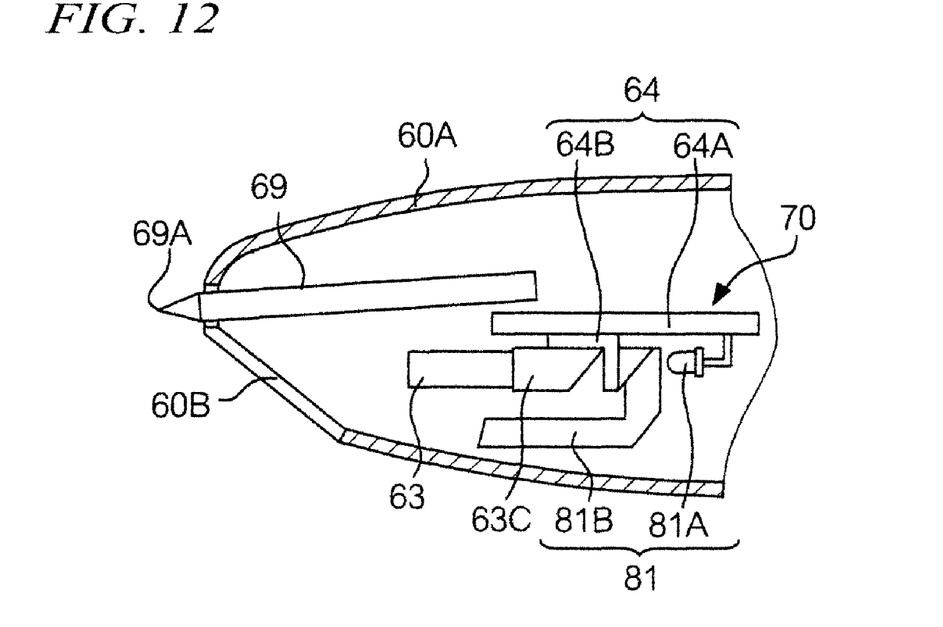
FIG. 12 is a cross-sectional view illustrating the configuration of a digital pen of Exemplary Operation 2.
Figure 13A:
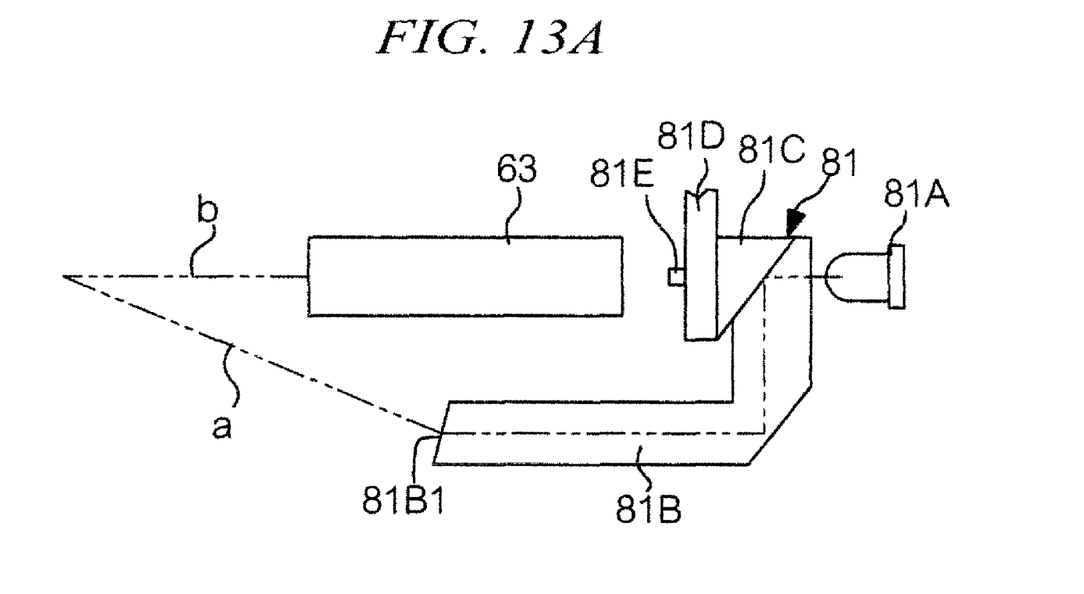
FIGS. 13A and 13B are enlarged views of a relevant unit in FIG. 11.
Figure 13B:
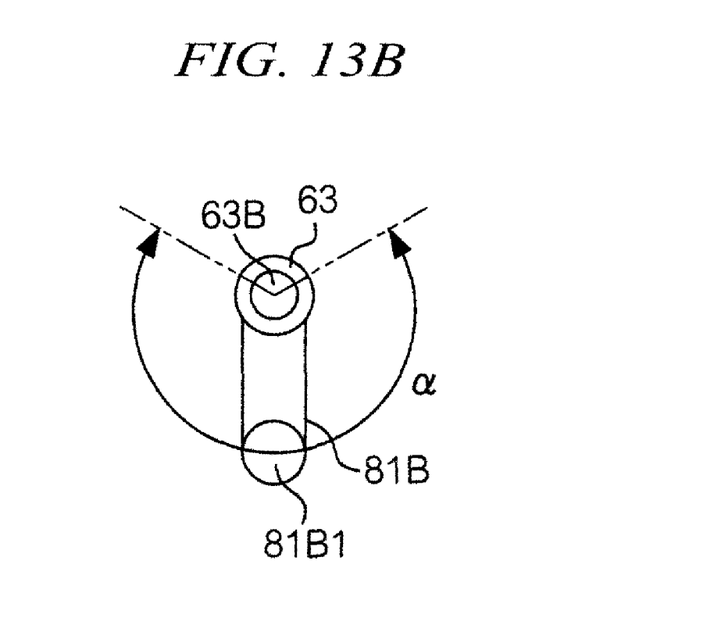

Next, another specific example of the irradiating unit 80 according to the present invention will be described based on FIG. 12 and FIGS. 13A and 13B. FIG. 12 is a cross-sectional view schematically showing a characteristic portion of the digital pen 60, FIG. 13A is an enlarged view showing a relevant unit in FIG. 12, and FIG. 13B is side view looking at FIG. 13A from the left side. Note that in this specific example, the same reference numerals are given to constituent elements that are the same as the aforementioned exemplary embodiment, and description thereof will be omitted.

An optics unit 70 according to this specific example has an imaging unit 64, an image forming unit 63 and an irradiating unit 81.

Here, the irradiating unit 81 has a light source 81A mounted on a substrate 64A, a light guiding member 81B for guiding light from this light source 81A and irradiating the light along the irradiation axis a toward a medium, and a shading cover (not shown) for ensuring that light from the light source 81A does not leak into the periphery. The light guiding member 81B is formed in an "L" shape, and forms an optical path such as shown in FIG. 13A, with the front end being a light irradiating unit 81B1.

Further, the rear end side of the light guiding member 81B is fixed to a fixing unit 81C that has a triangular cross-section, and this fixing unit 81C is rotatably supported by an axis unit 81E in a flange 81D that is fixed to the substrate 64A. This axis unit 81E is disposed on an extension of the light receiving axis b. The fixing unit 81C, the flange 81D and the axis unit 81E constitute an exemplary adjusting unit.

In the irradiating unit 81 thus constituted, the light guiding member 81B is rotatable around the light receiving axis b by the axis unit 81E, and the light guiding member 81B rotatably moves to the downside under own weight. Further, the range through which the light guiding member 81B rotates is an angle α (e.g., α=200°) (α≧180°), as shown in FIG. 13B. An exemplary adjusting unit that rotatably changes the direction of the irradiation axis a of the irradiating unit 81 around the rotation center of the light receiving axis b is constituted by the light guiding member 81B and the attachment structure of the light guiding member 81B.

The irradiating unit 81 thus constituted operates similarly to the aforementioned irradiating unit 80, and receives reflected light of only a diffuse component with the imaging unit 64, enabling reading errors to be reduced and reading accuracy to be improved. Moreover, because the light source 81A is not moved, the reliability of the light source 81A can be improved.

E: Variations

Hereinabove, exemplary embodiments of the present invention were described, but the present invention is not limited to the abovementioned exemplary embodiments, and various other exemplary embodiments can be implemented. Examples of these will be shown hereinafter. Note that the following illustrative embodiments may be combined.

(1) In the abovementioned exemplary embodiments, the irradiation axis a is rotatably moved around the rotation center of the light receiving axis b, but the present invention is not limited to this, and may be configured to change the angle between the irradiation axis a and the light receiving axis b at the point where the axes meet.

(2) Also, the adjusting unit is not limited to the examples disclosed in the above exemplary embodiments, and may be configured such that an arc-shaped rail is provided so as to be centered on the image forming unit 63 in a position removed from the image forming unit 63, and the light source moves under own weight along this rail, and, in short, needs only be configured such that the optical axis of light generated from the irradiating unit is moved under the own weight of the irradiating unit.

(3) In the abovementioned exemplary embodiments, a digital pen for writing characters, graphics and the like on a medium 50 was described, but the present invention is not limited to this, and the digital pen may, for example, be provided with a pointing device (mouse) function, or a stylus function of reading information (e.g., command information) recorded in correspondence with areas on a medium.

Note that in the exemplary operations of the embodiments, exemplary operations in the case where characters or the like are written on the medium 50 were described, but the present invention is not limited to these, and the digital pen 60 of the abovementioned exemplary embodiments are also effective in the case where a position on a display surface is merely designated, such as where a soft button provided on the medium 50 is selected, for example.

(4) In the abovementioned exemplary embodiments, a near-infrared LED that irradiates near-infrared light is used as the irradiating unit 80, but the irradiating unit 80 is not limited to this, and an LED having different characteristics may be used. In short, the irradiating unit 80 need only irradiate a light that enables the code pattern image formed on the medium 50 to be read with the reflected light thereof.

(5) In the abovementioned exemplary embodiments, information that uniquely identifies the medium is used as identification information, but the identification information is not limited to this, and information that uniquely identifies the electronic document may be used as identification information, for example. In the case where information that uniquely identifies the medium is used, as in the first embodiment, different identification information is assigned to different media when multiple copies of the same electronic document are formed. In contrast, in the case where information that uniquely identifies the electronic document is used as identification information, the same identification information is assigned even to different media when the same electronic document is formed.

Also, in the abovementioned exemplary embodiments, a code pattern image representing position information and identification information is read, but the information represented by the code pattern image is not limited to position information or identification information, and may, for example, be information representing text data or a command, or an image representing only position information. In short, an image representing information of some sort need only be formed on the medium 50.

(6) In the aforementioned image forming apparatus, the code pattern image is formed using Black toner. This is because Black toner absorbs more infrared light than Cyan, Magenta or Yellow toner, and the code pattern image can be read in high contrast with the digital pen 60. However, the code pattern image can also be formed using a specialty toner. Here, an example of a specialty toner is an invisible toner with a maximum absorption rate in a visible light region (400 nm to 700 nm) of 7% or less, and an absorption rate in a near-infrared region (800 nm to 1000 nm) of 30% or more. Here, "visible" and "invisible" have nothing to do with whether the toner can be visually perceived. "Visible" and "invisible" are distinguished by whether an image formed on a medium can be perceived due to whether the toner has color developing properties attributed to the absorption of specific wavelengths in the visible light region. Further, a toner that has some color developing properties attributed to the absorption of specific wavelengths in the visible light region but is difficult to perceive with the human eye is also included as "invisible". This invisible toner desirably has an average dispersion diameter in a range of 100 nm to 600 nm, in order to enhance the near-infrared light absorption capability necessary for mechanical reading of images.

Also, the image forming apparatus is not limited to an electrophotographic system, and may use any other system, such as an inkjet system.

(7) A computer program that is executed by the controller 61 of the digital pen 60 according to the abovementioned exemplary embodiments can be provided in a state of being stored on a computer-readable recording medium such as magnetic recording medium (magnetic tape, magnetic disk, etc.), an optical recording medium (optical disk, etc.), an magneto-optical recording medium, or a semiconductor memory. Further, the computer program can also be downloaded to the digital pen 60 via a network such as the Internet. Note that various devices other than a CPU can be applied as a controller that performs the abovementioned control, and a dedicated processor may be used, for example.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
an irradiating unit that irradiates light onto a medium;
an image forming unit that forms an image from irradiated light reflected from the medium; and
an adjusting unit that causes an optical axis of irradiated light to be adjusted, under influence of weight of the irradiating unit, with respect to an optical axis of reflected light that occurs when the image forming unit forms an image of the reflected light.

2. The image reading device according to claim 1, wherein the adjusting unit includes a mechanism for causing the irradiating unit to rotate under influence of the weight around the optical axis of reflected light that occurs when the image forming unit forms an image of the reflected light.

3. The image reading device according to claim 1, wherein the irradiating unit includes a light source and a guiding member that guides light emitted from the light source in a direction of the medium.

4. The image reading device according to claim 2, wherein the irradiating unit includes a light source and a guiding member that guides light emitted from the light source in a direction of the medium.

5. The image reading device according to claim 2, wherein an angle of the rotation is at least 180 degrees.

6. The image reading device according to claim 3, wherein an angle of the rotation is at least 180 degrees.

7. The image reading device according to claim 4, wherein an angle of the rotation is at least 180 degrees.

8. The image reading device according to claim 1, wherein a weight is provided in the irradiating unit.

9. The image reading device according to claim 2, wherein a weight is provided in the irradiating unit.

10. The image reading device according to claim 3, wherein a weight is provided in the irradiating unit.

11. The image reading device according to claim 1, further comprising a generating unit that generates a signal based on the reflected light whose image is formed by the image forming unit.

12. The image reading device according to claim 2, further comprising a generating unit that generates a signal based on the reflected light whose image is formed by the image forming unit.

13. The image reading device according to claim 3, further comprising a generating unit that generates a signal based on the reflected light whose image is formed by the image forming unit.

* * * * *